US006959785B1

(12) United States Patent
Chilton

(10) Patent No.: US 6,959,785 B1
(45) Date of Patent: Nov. 1, 2005

(54) STABILIZING SYSTEM FOR LADDERS AND SCAFFOLDING

(76) Inventor: Wade J. Chilton, 134 Nursey La., Ararat, NC (US) 27007

(*) Notice: Subject to any disclaimer, the term of this patent is extended or adjusted under 35 U.S.C. 154(b) by 0 days.

(21) Appl. No.: 10/693,725

(22) Filed: Oct. 24, 2003

(51) Int. Cl.[7] ............................ E04G 5/02; E06C 7/06; F16M 11/26

(52) U.S. Cl. ...................... 182/107; 182/214; 182/200; 248/188.5

(58) Field of Search ................................ 182/107, 214, 182/108, 129, 230, 121, 200; 248/210, 211, 248/238, 188.2, 188.3, 188.5

(56) References Cited

U.S. PATENT DOCUMENTS

| | | | | |
|---|---|---|---|---|
| 2,552,941 | A | 5/1951 | Courtney | |
| 3,059,723 | A * | 10/1962 | Shore | 182/107 |
| 3,724,592 | A * | 4/1973 | Fleischer | 182/27 |
| 4,090,586 | A | 5/1978 | Pears | |
| 4,469,194 | A | 9/1984 | McBride | |
| 4,798,263 | A | 1/1989 | Harvey et al. | |
| 4,899,849 | A | 2/1990 | Levi et al. | |
| 5,007,503 | A | 4/1991 | Sturm | |
| 5,113,973 | A | 5/1992 | Southern | |
| 5,373,913 | A | 12/1994 | Santos | |
| 5,423,397 | A | 6/1995 | Boughner | |
| 5,551,529 | A | 9/1996 | Molitor | |
| 6,152,262 | A | 11/2000 | Jung | |
| 6,360,845 | B1 * | 3/2002 | Allison | 182/107 |
| 6,382,353 | B2 * | 5/2002 | Laug | 182/107 |
| 6,405,828 | B1 | 6/2002 | Redding | |
| 6,478,113 | B1 * | 11/2002 | Ellison | 182/204 |
| 6,527,084 | B2 | 3/2003 | Hrincu | |

* cited by examiner

*Primary Examiner*—Hugh B. Thompson, II
(74) *Attorney, Agent, or Firm*—Jeffrey A Proehl; Leonard & Proehl, Prof. L.L.C.

(57) ABSTRACT

A stabilizing ladder system is disclosed that comprises a ladder of scaffold assembly with a pair of rails and a plurality of rungs. The system further includes a ladder leveling assembly comprising a lower extension arm mounted on each of the rails of the ladder assembly, and each lower extension arms is slidably inserted and extendable from the lower end of one of the rails for engaging a ground surface. The system also includes a lower stabilizer assembly for stabilizing a lower portion of the ladder assembly with respect to the ground surface. The lower stabilizer assembly comprises a pair of outboard foot assemblies with a position of each of the outboard foot assemblies being laterally adjustable with respect to the rails of the ladder assembly such that a lateral spacing of the outboard foot assemblies is adjustable.

19 Claims, 10 Drawing Sheets

STABILIZING SYSTEM FOR LADDERS AND SCAFFOLDING

BACKGROUND OF THE INVENTION

1. Field of the Invention

The present invention relates to stabilizing apparatus and more particularly pertains to a new stabilizing system for ladders and scaffolding for providing height adjustability, adaptability for resting upon uneven or stepped terrain, adaptability for leaning against uneven or stepped vertical surfaces, and enhanced bracing of horizontally extended portions of the ladder or scaffolding.

2. Description of the Prior Art

The use of stabilizing apparatus for ladders and ladder-like structures is known in the prior art, as well as the use of apparatus for adapting ladders to uneven terrain. However, the known devices have lacked the flexibility to not only adapt to uneven terrain below the ladder, but also stabilize the ladder and provide additional support to the ladder when the ladder extends a significant distance between supporting surfaces. Further, the known prior art has not provided the ability to adjust the ladder to irregularities in each of the surfaces supporting the ladder.

In these respects, the stabilizing system for ladders and scaffolding according to the present invention substantially departs from the conventional concepts and designs of the prior art, and in so doing provides an apparatus primarily developed for the purpose of providing height adjustability, adaptability for resting upon uneven or stepped terrain, adaptability for leaning against uneven or stepped vertical surfaces, and enhanced bracing of horizontally extended portions of the ladder or scaffolding.

SUMMARY OF THE INVENTION

In view of the foregoing disadvantages inherent in the known types of stabilizing apparatus now present in the prior art, the present invention provides a new stabilizing system for ladders and scaffolding construction wherein the same can be utilized for providing height adjustability, adaptability for resting upon uneven or stepped terrain, adaptability for leaning against uneven or stepped vertical surfaces, and enhanced bracing of horizontally extended portions of the ladder or scaffolding.

To attain this, the present invention generally comprises a stabilized ladder system is disclosed that comprises a ladder assembly with a pair of rails and a plurality of rungs. The system further includes a ladder leveling assembly comprising a lower extension arm mounted on each of the rails of the ladder assembly, and each lower extension arms is slidably inserted and extendable from the lower end of one of the rails for engaging a ground surface. The system also includes a lower stabilizer assembly for stabilizing a lower portion of the ladder assembly with respect to the ground surface. The lower stabilizer assembly comprises a pair of outboard foot assemblies with a position of each of the outboard foot assemblies being laterally adjustable with respect to the rails of the ladder assembly such that a lateral spacing of the outboard foot assemblies is adjustable.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the ability to adjust the bearing of the ladder assembly to irregularities in spaced surfaces on which the ladder is supported, while providing additional support and stabilization to the ladder assembly.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
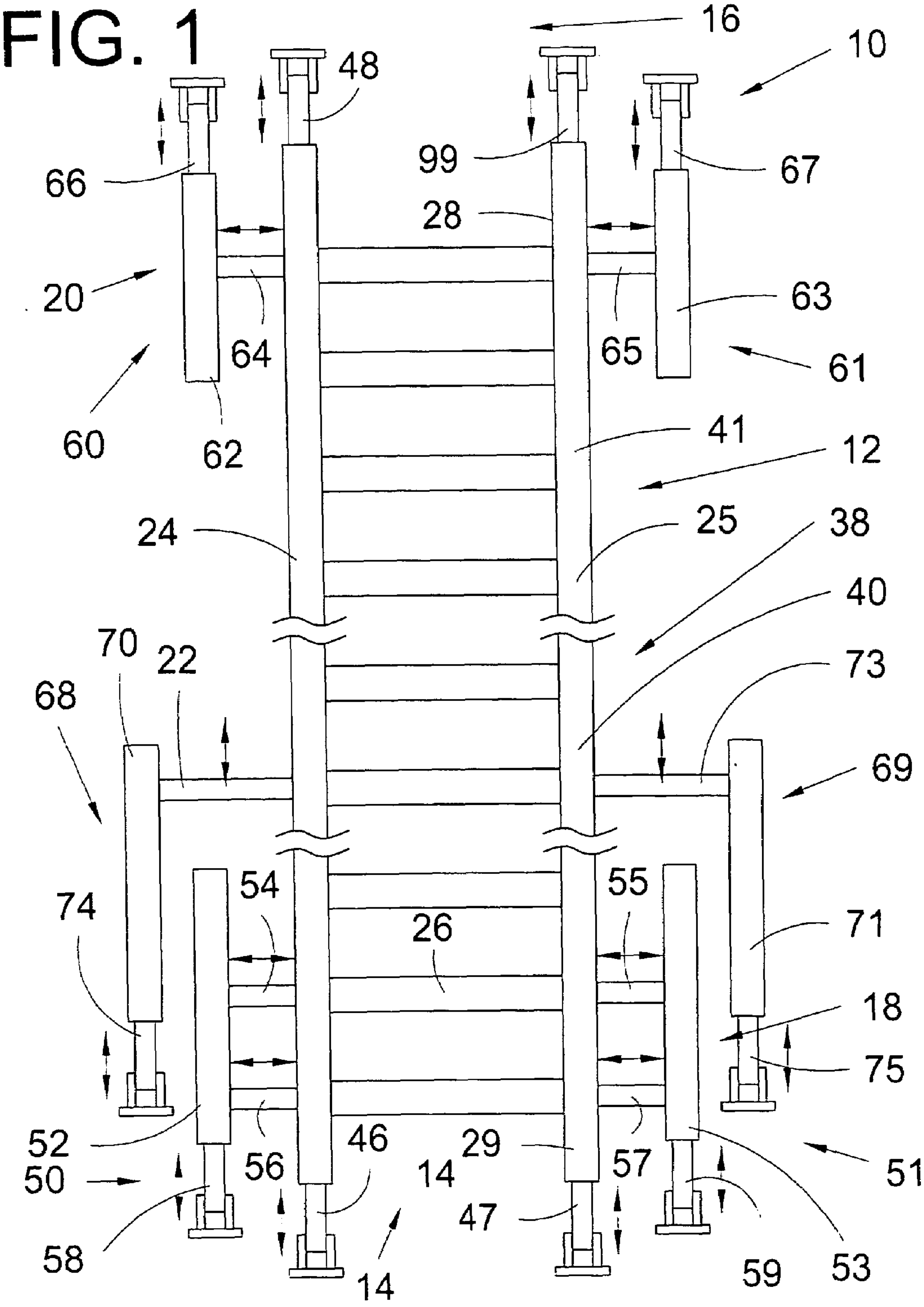
FIG. 1 is a schematic top view of a new stabilizing system for ladders and scaffolding according to the present invention implemented on a single section or a multiple section ladder.
Figure 2:
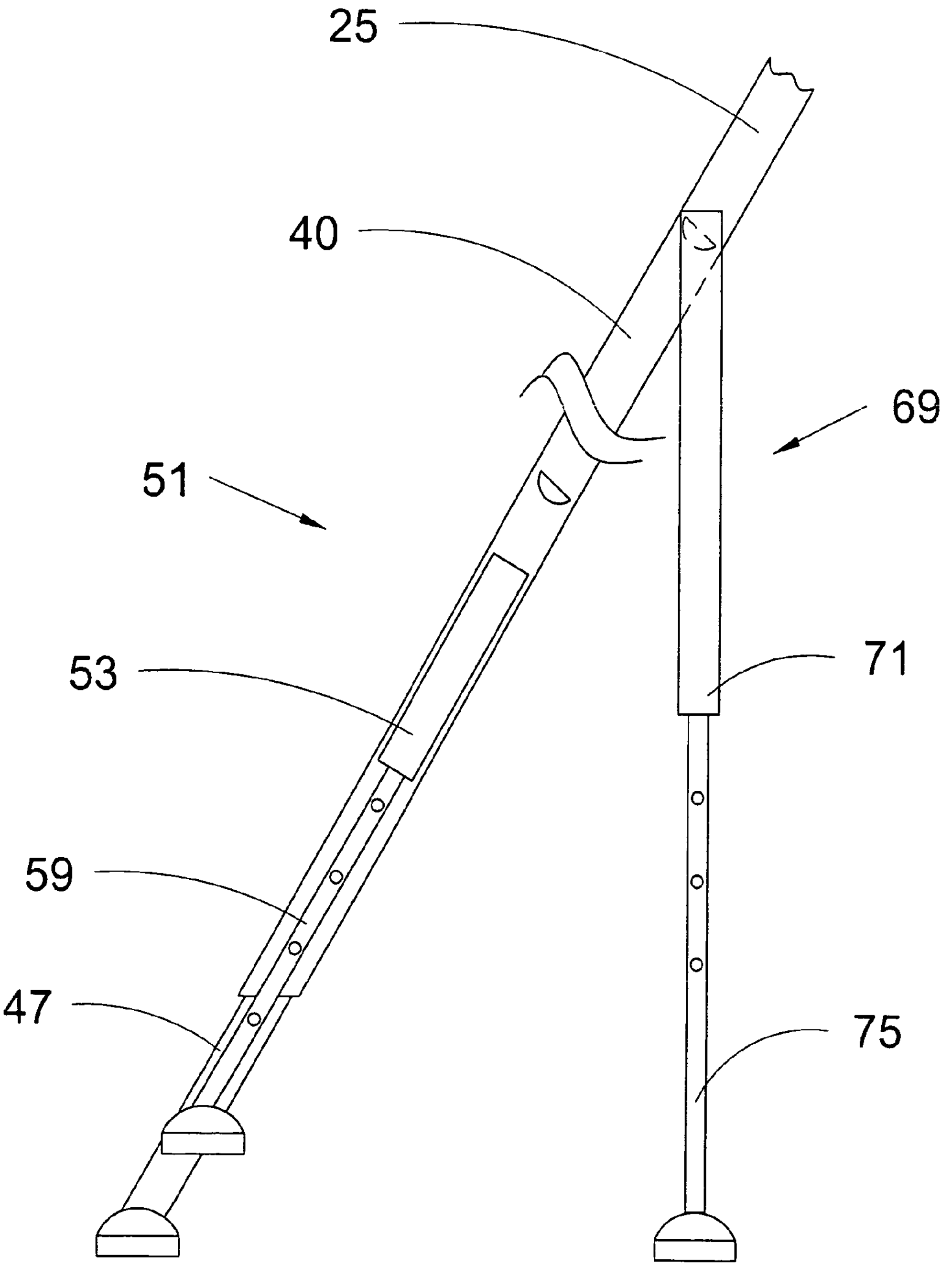
FIG. 2 is a schematic side view of a lower broken away portion of the implementation of the present invention shown in FIG. 1.
Figure 3:
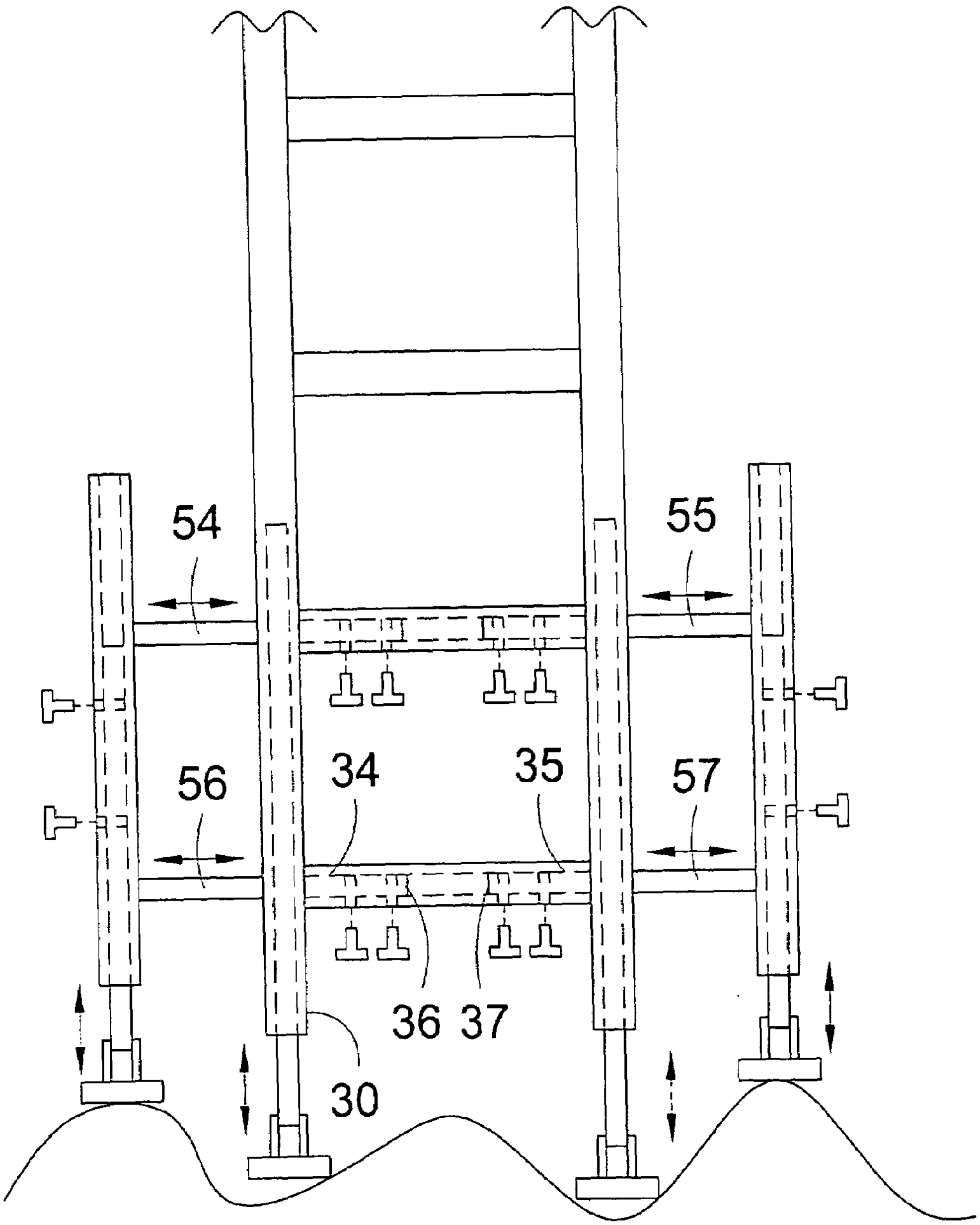
FIG. 3 is a schematic top view of the lower portion of the implementation of the present invention shown in FIGS. 1 and 2 with the outboard steadying assemblies removed for clarity.
Figure 4:
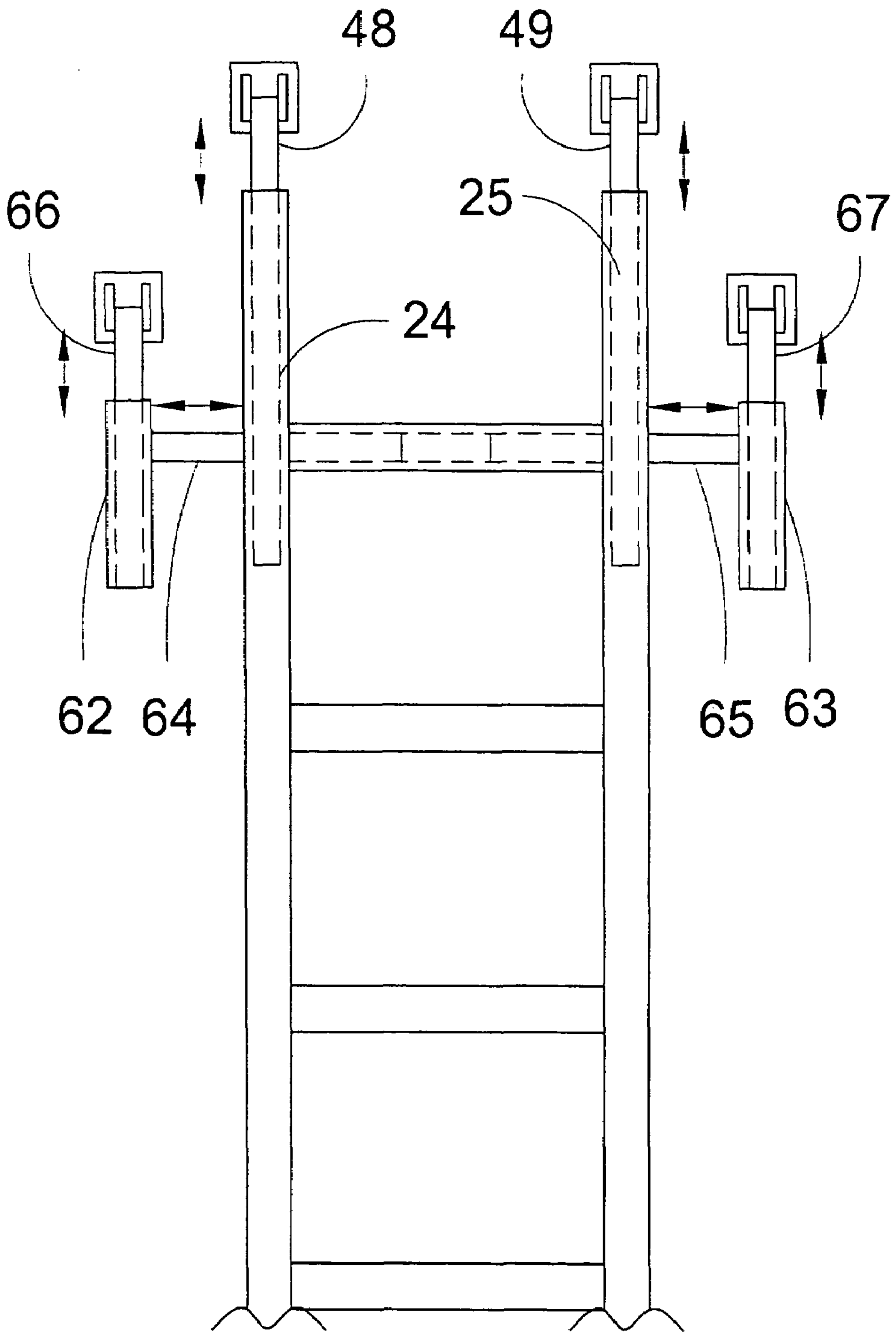
FIG. 4 is a schematic top view of an upper broken away portion of the implementation of the present invention shown in FIG. 1.

With reference now to the drawings, and in particular to FIGS. 1 through 10 thereof, a new stabilizing system for ladders and scaffolding embodying the principles and concepts of the present invention and generally designated by the reference numeral 10 will be described.

As best illustrated in FIGS. 1 through 10, the stabilizing system 10 for ladders and scaffolding of the invention generally may comprise a ladder or scaffold assembly 12, a ladder leveling assembly 14, a ladder extending assembly 16, a lower stabilizing assembly 18, an upper stabilizing assembly 20, and a medial stabilizing assembly 22.

The ladder assembly 12 of the stabilized ladder system 10 may generally comprise a pair of rails 24, 25 and a plurality of rungs 26, 27 that extend between the rails 24, 25. Each of the rails 24, 25 has an upper end 28 and a lower end 29, with the upper end being positioned at a relatively higher vertical level than the lower end when the ladder assembly is positioned for use. In various embodiments of the invention, each of the rails 24, 25 may have a lower cavity 30 extending into the lower end 29 of the rail. In other various embodiments of the invention, each of the rails 24, 25 may have an upper cavity 32 extending into the upper end 28 of the rail. Each of the rungs 26, 27 has opposite ends 34, 35, and at least one of the rungs may have an end cavity 36, 37 extending into each of the opposite ends of the rung with the end cavity extending also through the rail 24, 25 such that the end cavity is accessible from the outer lateral side of the rail.

In one embodiment 38 of the invention, the ladder assembly 12 forms a fixed, single section ladder, or an extension ladder with two ladder sections 40, 41 that are longitudinally extendable and retractable with respect to each other, as generally shown in FIGS. 1 through 4. In another embodiment 42 of the invention, shown in FIGS. 5 and 6, the ladder assembly comprises a multiple position ladder assembly with multiple positions, including a step ladder position shown in FIG. 5 and a bridging ladder position shown in FIG. 6. In yet another embodiment 44 of the invention, shown in FIG. 7, the ladder assembly comprises a scaffolding or scaffolding-like structure with a pair of substantially vertically oriented scaffold supports 110, 112 with a substantially-horizontally-oriented platform 114 spanning between the vertically oriented sections.

The system 10 may include the ladder leveling assembly 14 which includes a pair of lower extension arms 46, 47, with each lower extension arm being mounted on one of the rails 24, 25 of the ladder assembly. Each of the lower extension arms 46, 47 may be extendable from the lower end 29 of one of the rails 24, 25, and each of the lower extension arms may have an upper end that is slidably inserted into the lower cavity 30 of the rail. A lower end of each of the lower extension arms 46, 47 may have a foot mounted thereon, and the foot may be pivotable with respect to the arm to permit adaptation to the orientation of the ground surface below the arm. Each of the lower extension arms 46, 47 (and the foot mounted thereon) may be extendable from the rail 24, 25 for engaging the ground surface.

The system 10 may also include the ladder extending assembly 16 that comprises a pair of upper extension arms 48, 49, with each upper extension arm being mounted on one of the rails 24, 25 of the ladder assembly 12. Each of the upper extension arms 48, 49 may be extendable from the upper end 28 of one of the rails, and each of the upper extension arms may have a lower end that is slidably inserted into the end cavity 32 of the rail 24, 25. A lower end of each of the upper extension arms 48, 49 may have a resting member mounted thereon, and the resting member may be pivotable with respect to the arm to permit adaptation to the orientation of a structure against which the resting member rests, such as the side of a building. Each of the upper extension arms 48, 49 and the resting member mounted thereon may thus be extendable from the rail 24, 25 for engaging a structure, even when the surface of the structure is uneven or not squared up with the rails.

The system 10 may also include the lower stabilizer assembly 18 for stabilizing a lower portion of the ladder assembly 12 with respect to a ground surface. The lower stabilizer assembly 18 may comprise a pair of lower outboard foot assemblies 50, 51 with a position of each of the lower outboard foot assemblies being laterally adjustable with respect to the rails 24, 25 of the ladder assembly 12 such that a lateral spacing of the pair of lower outboard foot assemblies 50, 51 is adjustable. Each of the lower outboard foot assemblies 50, 51 may include a lower outboard rail 52, 53 that extends substantially parallel to the rails 24, 25 of the ladder assembly. Each of the lower outboard rails 52, 53 has a lower end and a lower end cavity 54 extending into the lower end of the lower outboard rail.

Each of the lower outboard foot assemblies 50, 51 may include an upper lateral brace arm 54, 55 which has an inner end that extends into one of the ends of the rungs 26 of the ladder assembly 12. An outer end of each of the upper lateral brace arms 54, 55 may be mounted on one of the lower outboard rails 52, 53. The inner end of each of the upper lateral brace arms 54, 55 may be slidably received in the rung 26 for adjusting a lateral spacing between the lower outboard rails 52, 53 and a respective one of the rails 24, 25 of the ladder assembly.

Each of the lower outboard foot assemblies 50, 51 may comprise a lower lateral brace arm 56, 57 having an inner end that extends into one of the ends of the rungs 27 of the ladder assembly 12. An outer end of each of the lower lateral brace arms 56, 57 may be mounted on the lower outboard rail 52, 53, and the inner end of each of the lower lateral brace arms may be slidably received in the rung 27 for adjusting a lateral spacing between the lower outboard rails 52, 53 and a respective one of the rails 24, 25 of the ladder assembly.

Each of the outboard foot assemblies 50, 51 may also comprise a securing means 80 for releasably securing the position of at least one of the lateral brace arms 54, 55, 56, 57, with respect to a respective one of the rungs 26, 27 of the ladder assembly. In the illustrative embodiment of the invention, the means for securing the position of the lateral brace arms with respect to the rungs comprises a system of alignable holes formed in the lateral brace arm and the rung, with an insertable and removable pin positionable in the holes to fix the positions of the arm and rung with respect to each other. A first one of these elements may have a single hole, and a second one of the elements may have a series of substantially uniformly spaced holes that may be aligned with the single hole of the first element so that the pin may be inserted to prevent sliding relative movement of the elements until the pin is removed.

Each of the outboard foot assemblies 50, 51 may further include an outboard extension leg 58, 59 that has an upper end that is slidably inserted into the lower end cavity of the lower outboard rail 52, 53. A lower end of the outboard extension leg 58, 59 may have a foot mounted thereon, and the outboard extension leg and the foot may be extendable from the lower outboard rail 52, 53 for engaging the ground surface to adapt the position of the foot to the position of the ground surface therebeneath, especially where the ground surface is sloped and the level of the ground surface is lower at the outboard foot assembly as compared to the end of the rails 24, 25 of the ladder assembly 12.

The system 10 of the invention may also include an upper stabilizer assembly 20 for stabilizing an upper portion of the ladder assembly 12 with respect to a structure. The upper stabilizer assembly 20 may comprise a pair of outboard support assemblies 60, 61 with a position of each of the outboard support assemblies being laterally adjustable with respect to the rails of the ladder assembly such that a lateral spacing of the pair of outboard support assemblies is adjustable, which can be useful for broadening the span of engagement with the surface of the structure.

Each of the outboard support assemblies 60, 61 may comprise an upper outboard rail 62, 63 that extends substantially parallel to the rails 24, 25 of the ladder assembly 12. The upper outboard rail 62, 63 may have an upper end, and an upper end cavity may extend into the upper end of the upper outboard rail.

Each of the outboard support assemblies 60, 61 may further comprise a lateral brace arm 64, 65 that has an inner end extending into one of the ends of the rungs of the ladder assembly 12. An outer end of the lateral brace arm 64, 65 may be mounted on the upper outboard rail 62, 63. The inner end of the lateral brace arm may be slidably received in the rung for adjusting a lateral spacing between the upper outboard rail 62, 63 and one of the rails 24, 25 of the ladder assembly.

Each of the outboard support assemblies 60, 61 may also comprise securing means for releasably securing the position of the lateral brace with respect to a respective one of the rungs of the ladder assembly. The securing means may be as previously described for the outboard stabilization lower stabilizing assemblies.

Each of the outboard support assemblies 60, 61 may still further comprise an outboard extension arm 66, 67 may have a lower end that is slidably inserted into the upper end cavity of the upper outboard rail 62, 63. An upper end of the outboard extension arm 66, 67 may have a contact member mounted thereon that is pivotable to accommodations in the orientation of the surface of the structure against which the contact member is rested. The outboard extension arm 66, 67 and the contact member may be extendable from the upper outboard rail for engaging the structure. The outboard extension arm 66, 67 may then accommodate variations in the surface of the structure, especially when the surface is uneven and the distance between the upper outboard rail and the surface of the structure and the distance between the upper end of the rail of the ladder assembly 12 and the surface of the structure are different.

The system 10 may also include the medial stabilizer assembly 22 for stabilizing a middle portion of the ladder assembly 12 with respect to the ground surface. The medial stabilizer assembly 22 may comprise a pair of outboard steadying assemblies 68, 69 with a position of each of the outboard steadying assemblies being laterally adjustable with respect to the rails 24, 25 of the ladder assembly 12 such that a lateral spacing of the pair of outboard steadying assemblies is adjustable.

Each of the outboard steadying assemblies 68, 69 may include a medial outboard rail 70, 71 that is extendable in a direction that is generally parallel to the rails 24, 25 of the ladder assembly 12, but the medial outboard rails may extend in a skewed direction out of a plane defined by the rails. The medial outboard rail 70, 71 has a lower end, and a lower end cavity may extend into the lower end of the medial outboard rail.

Each of the outboard steadying assemblies 68, 69 may further include a medial brace arm 72, 73 having an inner end that extends into one of the ends of the rungs 26, 27 of the ladder assembly. An outer end of the medial brace arm is mounted on the medial outboard rail 70, 71. The inner end of the medial brace arm 72, 73 may be slidably received in one of the rungs for adjusting a lateral spacing between the medial outboard rail 70, 71 and one of the rails 24, 25 of the ladder assembly 12.

Each of the outboard steadying assemblies 68, 69 may also include securing means for releasably securing the position of the medial brace with respect to a respective one of the rungs of the ladder assembly. The securing means may be similarly configured to the securing means described above.

Each of the outboard steadying assemblies 68, 69 may include an outboard steadying arm 74, 75 with an upper end that may be slidably inserted into the lower end cavity of the medial outboard rail 70, 71. A lower end of the outboard steadying arm 74, 75 may have a foot mounted thereon, and the foot may be pivotable with respect to the arm to permit adaptation to the orientation of the ground surface below the arm. The outboard steadying arm 74, 75 and the foot may be extendable from the medial outboard rail 70, 71 for engaging the ground surface.

Figure 5:
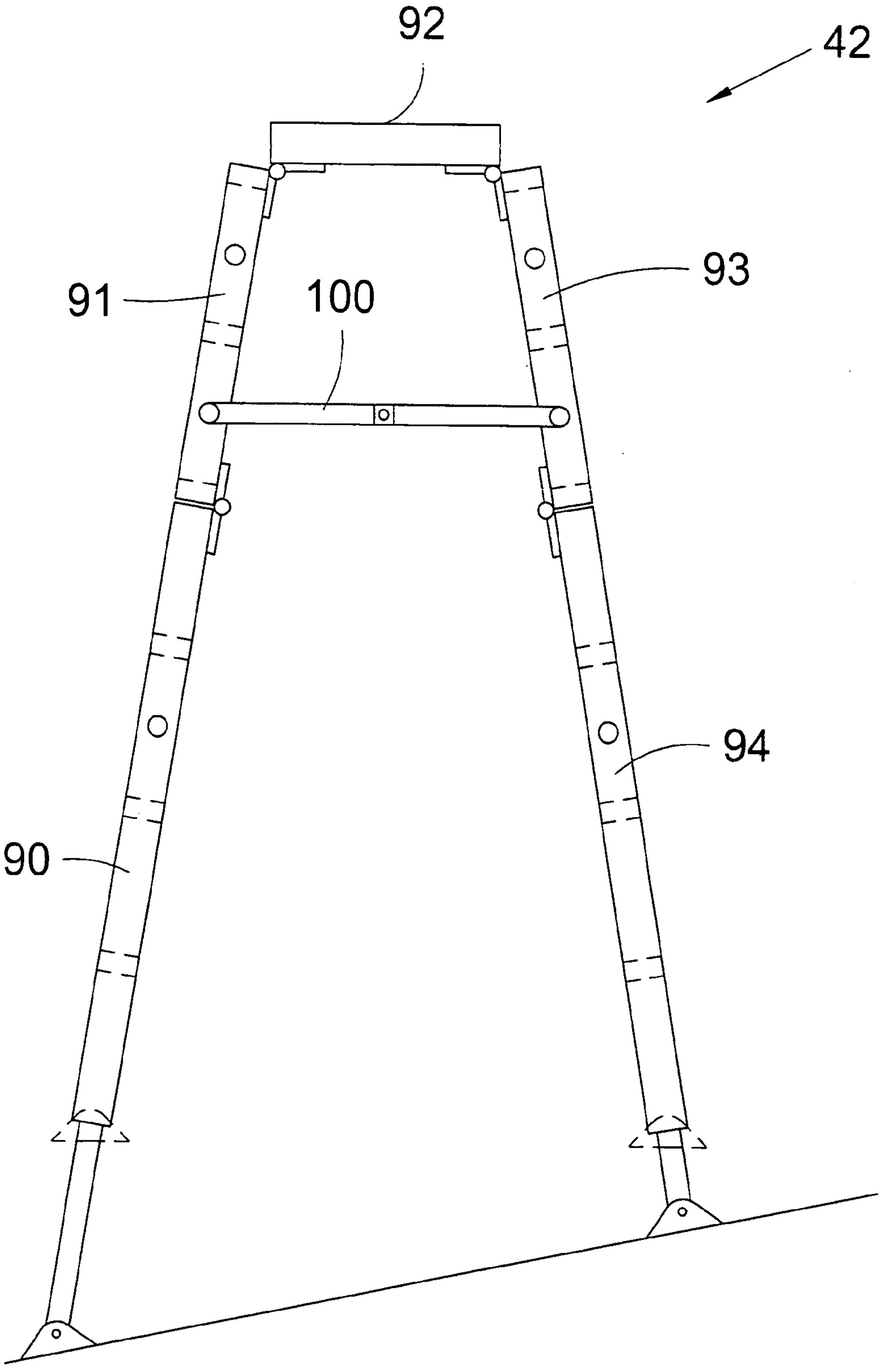
FIG. 5 is a schematic side view of another implementation of the present invention on a multiple position ladder that is shown in a step ladder position.
Figure 6:
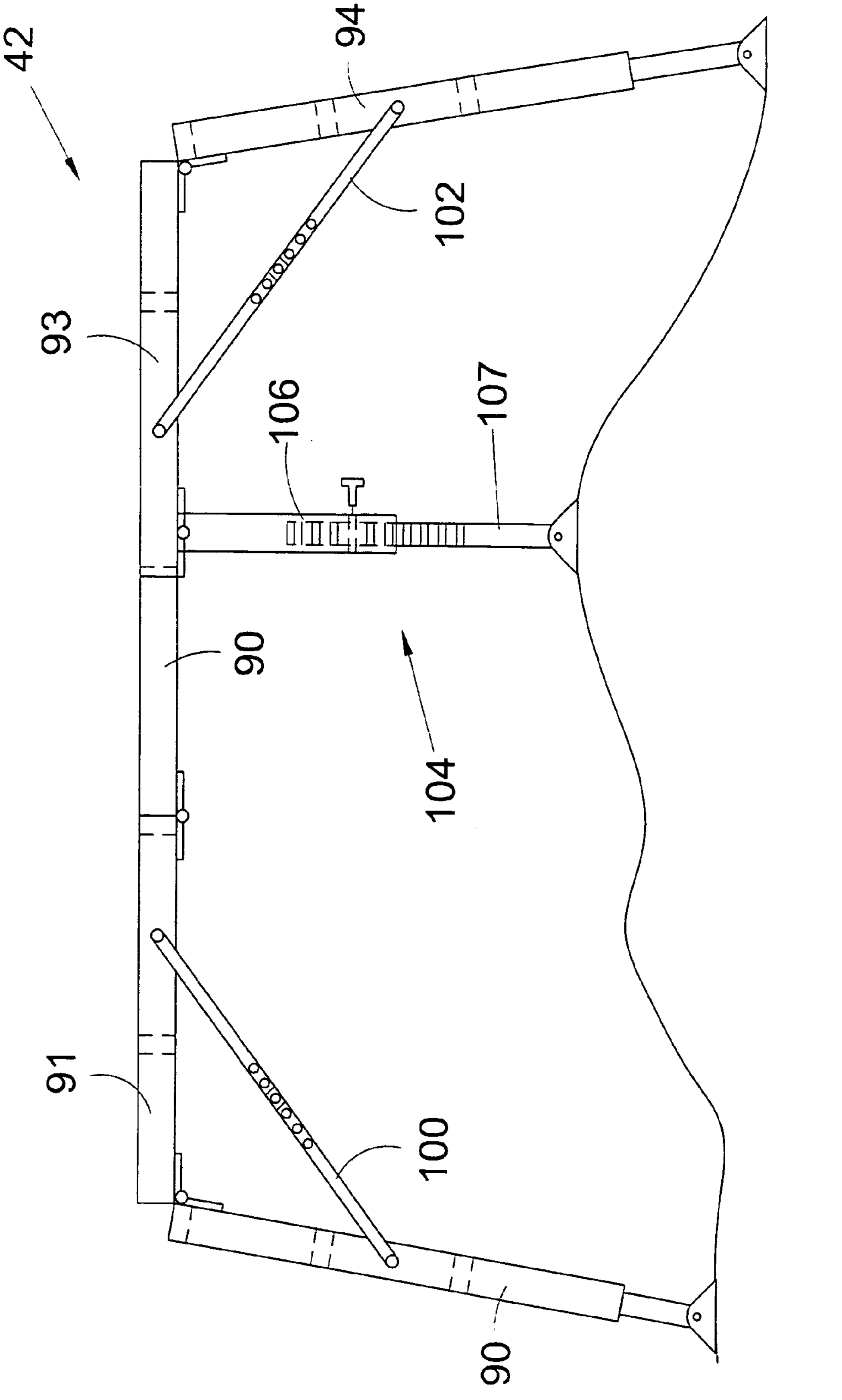
FIG. 6 is a schematic side view of the implementation of the present invention shown in FIG. 5 with the multiple position ladder shown in a bridging ladder position.

Turning to the multiple position ladder assembly 42 shown in FIGS. 5 and 6, it can be seen that the ladder assembly may include a plurality of ladder sections, and illustratively includes five ladder sections 90, 91, 92, 93, and 94. Each of the ladder sections 90–94 may include a pair of rails 24, 25 and a plurality of rungs 26, 27. The endmost ladder sections 90 and 94 may incorporate lower extension arms for selectively extending or shortening the sections 90 and 94 to adapt to uneven or sloping ground surfaces. In the step ladder position of the multiple position ladder assembly 42 shown in FIG. 5, the intermediate ladder section 91 may be positioned linear or coplanar with the ladder section 90 and the intermediate ladder section 93 may be positioned linear or coplanar with the endmost ladder section 94. The medial ladder section 92 is positioned angularly with respect each of the other ladder sections 90, 91, 93, and 94, so that it can be positioned substantially horizontally between the other ladder sections. A linking member 100 may be employed to keep the ladder sections 91, 92 and 93, 94 at the desired distance apart. The linking member 100 may include two sections that are pivotable with respect to each other.

In the bridging position of the multiple position ladder assembly 42 that is shown in FIG. 6, the endmost ladder sections 90 and 94 are positioned at an angle to intermediate ladder sections 91, 92, 93 which are oriented collinear and coplanar to each other in a substantially horizontal orientation. An additional locking member 102 may be included to secure the sections in position with respect to each other. In this configuration, a ladder medial steadying assembly 104 may be employed to steadying and support the intermediate ladder sections 91, 92, 93, in position, and may include a medial steadying rail 106 which telescopically receives a medial steadying arm 107 which may be adjusted to reach the ground surface.

Figure 7:
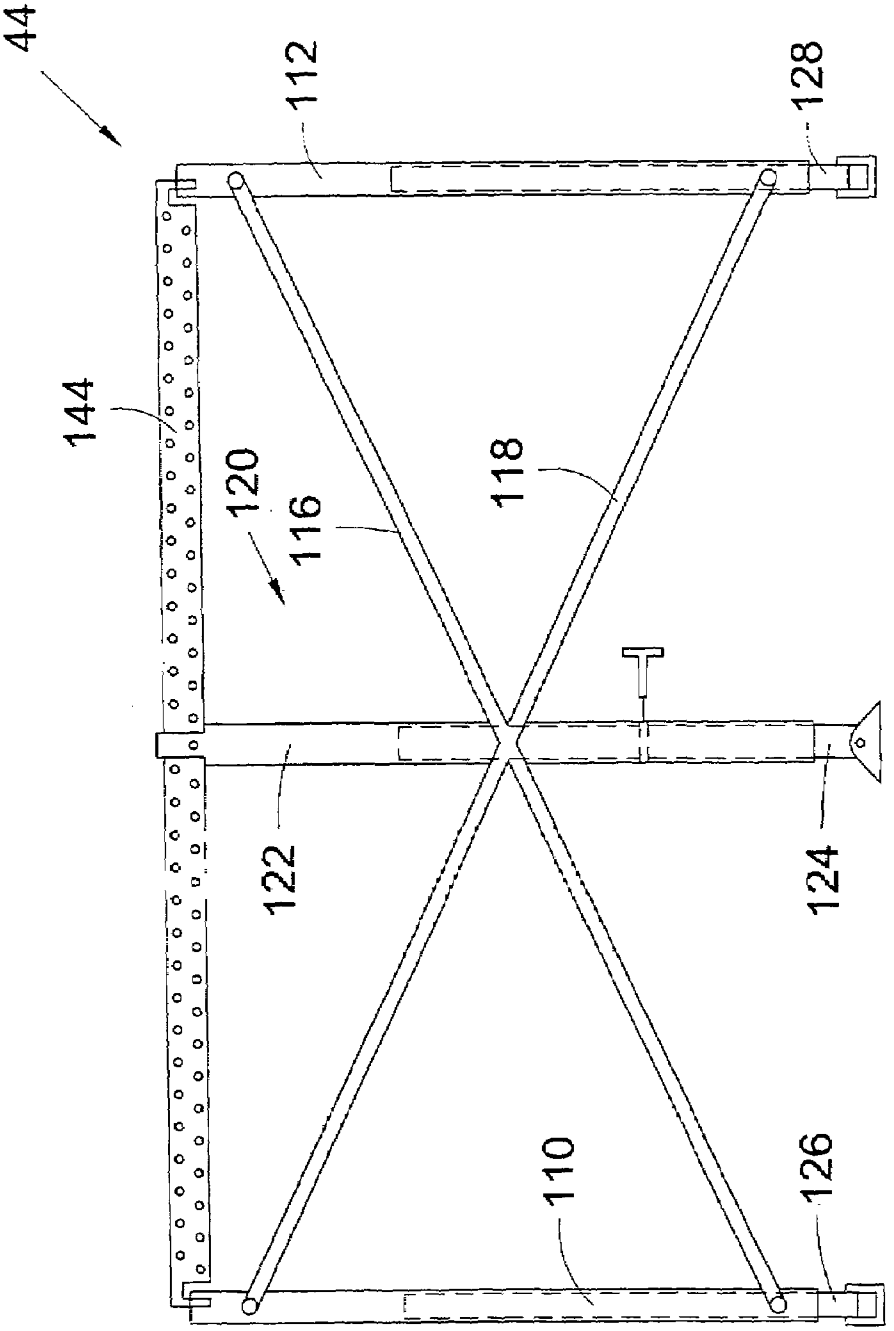
FIG. 7 is a schematic side view of another implementation of the present invention on a scaffold structure.
Figure 8:
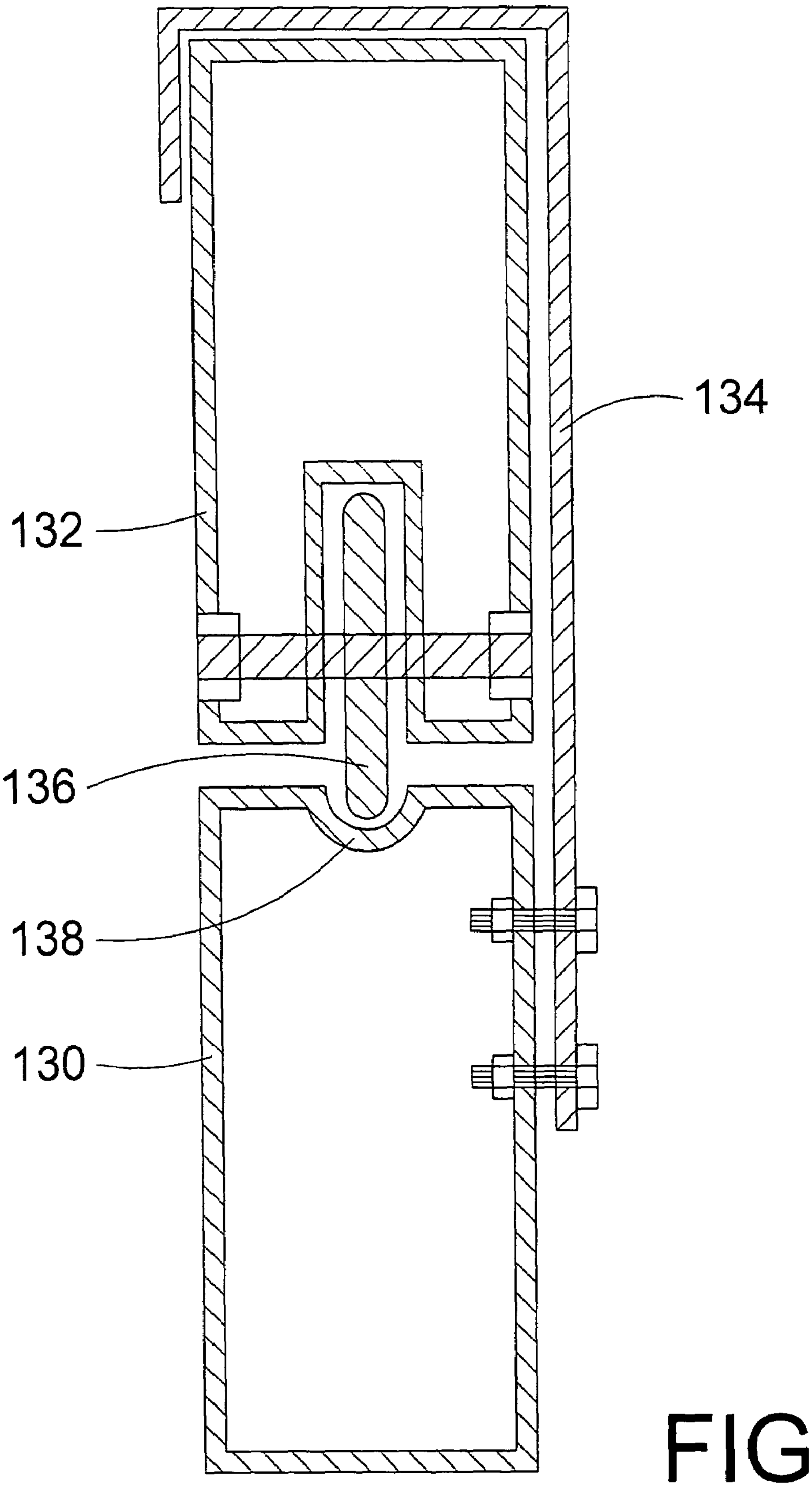
FIG. 8 is a schematic sectional view of one configuration of the moving and stationary elements of the present invention.
Figure 9:
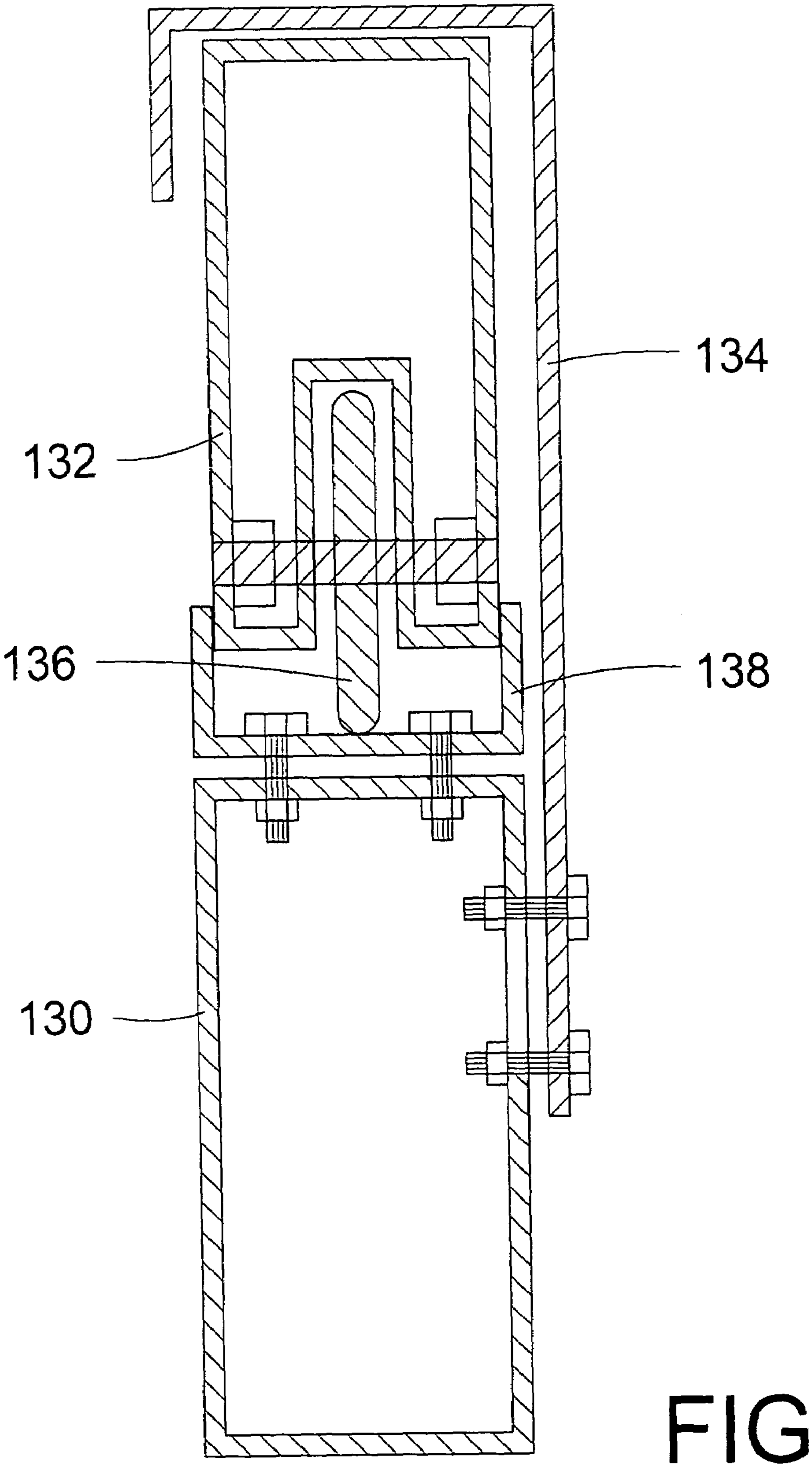
FIG. 9 is a schematic sectional view of another configuration of the moving and stationary elements of the present invention.
Figure 10:
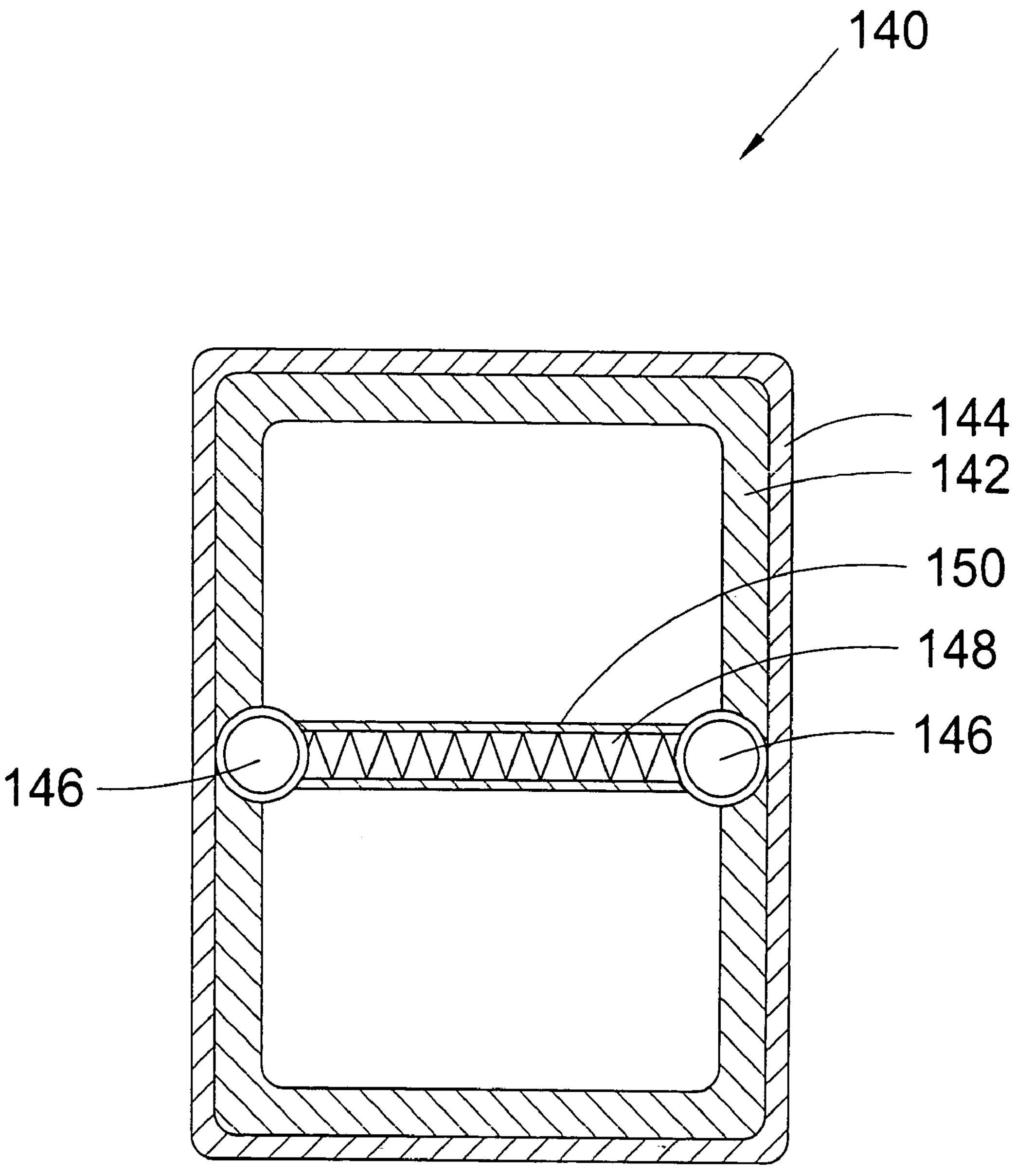
FIG. 10 is a schematic sectional view of still another configuration of the moving and stationary elements of the present invention.

Turning to the scaffolding structure 44 of the embodiment of the invention shown in FIG. 7 of the drawings, it can be seen that the structure 44 may includes a pair of scaffold supports 110, 112 and at least one platform 114 that spans between and is linked to the scaffold supports. Typically, each of the scaffold supports 110, 112 will include at least a pair of substantially vertically extending rails and at least two substantially horizontal rungs (not shown) extending between the rails to form stepping points when ascending the scaffold structure 44. The scaffold structure 44 may include a pair of cross members 116, 118, and there may be a pair of the cross members positioned at each side of the structure 44.

A medial steadying assembly 120 may be employed to provide additional support to the platform 114 of the scaffolding structure 44, and the steadying assembly may be positioned at a variety of positions along the platform although a substantially central position is deemed most effective. The steadying assembly 120 for the may include a steadying rail 122 that is removably mountable on the platform 114, and a steadying arm 124 that is telescopically mounted on the steadying rail 122. Each of the scaffold supports 110, 112 may also include at least one, and optionally two, lower extension arms 126, 128 that may be adjusted in extension from the respective support to meet the variations of the terrain at the location of the support.

In the aforedescribed embodiments of the invention, the various leveling, extending, and stabilizing assemblies, the structure of the assemblies includes one element telescopically received in another element to provide the adjustment of the assembly. In one embodiment of the invention, a nested telescopic assembly 140 shown in FIG. 10 includes an inner element 142 slidably and telescopically movable in an outer element 144. To facilitate the sliding movement of the elements 142 and 144 with respect to each other, a pair of roller balls 146 are nested in the inner element 142 and contacting the outer element 144. A biasing spring 148 positioned in a passage 150 between the roller balls 146 presses the roller balls 146 outwardly into contact with the inner surfaces of the outer element 144.

Other optional structures may be employed to effect the telescopic relationship of the various assemblies. One optional structure, shown in FIG. 8, a stationary element 130 is positioned beside a movable element 132. A bracket guide 134 is mounted on the stationary element 130 for guiding movement of the movable element 132 with respect to the stationary element in a substantially parallel direction. As a further option, a wheel 136 is rotatably mounted on the movable element 132 and contacts the stationary element 130 for facilitating movement of the movable element 132 with respect to the stationary element 130. As a further option, a channel 138 may be formed on and extend into an exterior surface of the stationary element 130 for providing further guidance for the movement of the movable element 132. In a variation of the aforedescribed structure, the channel 138 may be formed by a separate element mounted on the stationary element 130 extending toward the movable element 132, and may extend about a portion of the movable element 132 to provide additional guidance for the movable element 130 between the channel 138 and the bracket guide 134.

It should be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stabilized ladder system comprising:

a ladder assembly comprising a pair of rails and a plurality of rungs extending between the rails, each of the rails having an upper end and a lower end, each of the rails having a lower cavity extending into the lower end of the rail, each of the rungs having opposite ends and at least one of the rungs having an end cavity extending into each of the opposite ends of the rung through the rails;

a ladder leveling assembly comprising a lower extension arm mounted on each of the rails of the ladder assembly, each of the lower extension arms being extendable from the lower end of one of the rails, each of the lower extension arms having an upper end slidably inserted into the lower cavity of the rail, each of the lower extension arms mounted thereon being extendable from the rail for engaging the ground surface; and a lower stabilizer assembly for stabilizing a lower portion of the ladder assembly with respect to a ground surface, the lower stabilizer assembly comprising a pair of outboard foot assemblies with a position of each of the outboard foot assemblies being laterally adjustable with respect to the rails of the ladder assembly such that a lateral spacing of the pair of outboard foot assemblies is adjustable;

wherein each of the outboard foot assemblies comprises:

a lower outboard rail extending substantially parallel to the rails of the ladder assembly, the lower outboard rail having a lower end, a lower end cavity extending into the lower end of the lower outboard rail;

an upper lateral brace arm having an inner end extending into one of the ends of the rungs of the ladder assembly, an outer end of the upper lateral brace arm being mounted on the upper outboard rail, the inner end of the upper lateral brace arm being slidably received in the rung for adjusting a lateral spacing between the upper outboard rail and one of the rails of the ladder assembly, the upper lateral brace arm having a plurality of apertures formed therein for receiving a pin when the upper lateral brace arm is at more than one lateral spacing from one of the rails of the ladder assembly;

a lower lateral brace arm having an inner end extending into one of the ends of the rungs of the ladder assembly, an outer end of the lower lateral brace arm being mounted on the lower outboard rail, the inner end of the lower lateral brace arm being slidably received in the rung for adjusting a lateral spacing between the lower outboard rail and one of the rails of the ladder assembly, the lower lateral brace arm having a plurality of apertures formed therein for receiving a pin when the lower lateral brace arm is at more than one lateral spacing from one of the rails of the ladder assembly;

securing means for releasably securing the position of at least one of the lateral brace arms with respect to a respective one of the rungs of the ladder assembly; and an outboard extension leg having an upper end slidably inserted into the lower end cavity of the lower outboard rail, the outboard extension leg being extendable from the lower outboard rail for engaging the ground surface.

2. The system of claim 1 further comprising a ladder extending assembly comprising an upper extension arm mounted on each of the rails of the ladder assembly, each of the upper extension arms being extendable from the upper end of one of the rails, each of the upper extension arms having a lower end slidably inserted into the end cavity of the rail, each of the upper extension arms being extendable from the rail for engaging a structure;

wherein each of the rails has an upper cavity extending into the upper end of the rail, and additionally comprising an upper stabilizer assembly for stabilizing an upper portion of the ladder assembly with respect to a structure, the upper stabilizer assembly comprising a pair of outboard support assemblies with a position of each of the outboard support assemblies being laterally adjustable with respect to the rails of the ladder assembly such that a lateral spacing of the pair of outboard support assemblies is adjustable, wherein each of the outboard support assemblies comprises:

an upper outboard rail extending substantially parallel to the rails of the ladder assembly, the upper outboard rail having an upper end, an upper end cavity extending into the upper end of the upper outboard rail;

a lateral brace arm having an inner end extending into one of the ends of the rungs of the ladder assembly, an outer end of the lateral brace arm being mounted on the outboard rail, the inner end of the lateral brace arm being slidably received in the rung for adjusting a lateral spacing between the upper outboard rail and one of the rails of the ladder assembly;

securing means for releasably securing the position of the lateral brace arm with respect to a respective one of the rungs of the ladder assembly;

an outboard extension arm having a lower end slidably inserted into the upper end cavity of the upper outboard rail, an upper end of the outboard extension arm having a contact member mounted thereon, the outboard extension arm and the contact member being extendable from the upper outboard rail for engaging the structure; and a medial stabilizer assembly for stabilizing a middle portion of the ladder assembly with respect to a ground surface, the medial stabilizer assembly comprising a pair of outboard steadying assemblies with a position of each of the outboard steadying assemblies being laterally adjustable with respect to the rails of the ladder assembly such that a lateral spacing of the pair of outboard steadying assemblies is adjustable, wherein each of the outboard steadying assemblies comprises:

a medial outboard rail extendable substantially parallel to the rails of the ladder assembly, the medial outboard rail having a lower end, a lower end cavity extending into the lower end of the medial outboard rail;

a medial brace arm having an inner end extending into one of the ends of the rungs of the ladder assembly, an outer end of the medial brace arm being mounted on the outboard rail, the inner end of the medial brace arm being slidably received in the rung for adjusting a lateral spacing between the medial outboard rail and one of the rails of the ladder assembly;

securing means for releasably securing the position of the medial brace arm with respect to a respective one of the rungs of the ladder assembly;

an outboard steadying arm having an upper end slidably inserted into the lower end cavity of the medial outboard rail, the outboard steadying arm being extendable from the medial outboard rail for engaging the ground surface.

3. A stabilized ladder system comprising:

a ladder assembly comprising a pair of rails and a plurality of rungs extending between the rails, each of the rails having an upper end and a lower end, each of the rails having a lower cavity extending into the lower end of the rail, each of the rungs having opposite ends and at least one of the rungs having an end cavity extending into each of the opposite ends of the rung through the rails;

a ladder leveling assembly comprising a lower extension arm mounted on each of the rails of the ladder assembly, each of the lower extension arms being extendable from the lower end of one of the rails, each of the lower extension arms having an upper end slidably inserted into the lower cavity of the rail, each of the lower extension arms mounted thereon being extendable from the rail for engaging the ground surface; and a lower stabilizer assembly for stabilizing a lower portion of the ladder assembly with respect to a ground surface, the lower stabilizer assembly comprising a pair of outboard foot assemblies with a position of each of the outboard foot assemblies being laterally adjustable with respect to the rails of the ladder assembly such that a lateral spacing of the pair of outboard foot assemblies is adjustable;

a ladder extending assembly comprising an upper extension arm mounted on each of the rails of the ladder assembly, each of the upper extension arms being extendable from the upper end of one of the rails, each of the upper extension arms having a lower end slidably inserted into the end cavity of the rail, each of the upper extension arms being extendable from the rail for engaging a structure.

4. The system of claim 3 wherein each of the outboard foot assemblies comprises:

a lower outboard rail extending substantially parallel to the rails of the ladder assembly, the lower outboard rail having a lower end, a lower end cavity extending into the lower end of the lower outboard rail;

an upper lateral brace arm having an inner end extending into one of the ends of the rungs of the ladder assembly, an outer end of the upper lateral brace arm being mounted on the upper outboard rail, the inner end of the upper lateral brace arm being slidably received in the rung for adjusting a lateral spacing between the upper outboard rail and one of the rails of the ladder assembly;

a lower lateral brace arm having an inner end extending into one of the ends of the rungs of the ladder assembly, an outer end of the lower lateral brace arm being mounted on the lower outboard rail, the inner end of the lower lateral brace arm being slidably received in the rung for adjusting a lateral spacing between the lower outboard rail and one of the rails of the ladder assembly;

securing means for releasably securing the position of at least one of the lateral brace arms with respect to a respective one of the rungs of the ladder assembly; and an outboard extension leg having an upper end slidably inserted into the lower end cavity of the lower outboard rail, the outboard extension leg being extendable from the lower outboard rail for engaging the ground surface.

5. The system of claim 3 wherein each of the rails has an upper cavity extending into the upper end of the rail, and additionally comprising an upper stabilizer assembly for stabilizing an upper portion of the ladder assembly with respect to a structure, the upper stabilizer assembly comprising a pair of outboard support assemblies with a position of each of the outboard support assemblies being laterally adjustable with respect to the rails of the ladder assembly such that a lateral spacing of the pair of outboard support assemblies is adjustable.

6. The system of claim 3 wherein the ladder assembly comprises a scaffold structure with a pair of scaffold supports, each of the scaffold supports having the pair of rails and the plurality of rungs, the scaffold structure also including a platform for extending between the scaffold supports.

7. The system of claim 3 wherein the ladder assembly comprises a plurality of ladder sections each having the pair of rails and the plurality of rungs, each of the plurality of ladder sections being pivotally mounted to at least one other ladder section.

8. A stabilized ladder system comprising:

a ladder assembly comprising a pair of rails and a plurality of rungs extending between the rails, each of the rails having an upper end and a lower end, each of the rails having a lower cavity extending into the lower end of the rail, each of the rungs having opposite ends and at least one of the rungs having an end cavity extending into each of the opposite ends of the rung through the rails;

a ladder leveling assembly comprising a lower extension arm mounted on each of the rails of the ladder assembly, each of the lower extension arms being extendable from the lower end of one of the rails, each of the lower extension arms having an upper end slidably inserted into the lower cavity of the rail, each of the lower extension arms mounted thereon being extendable from the rail for engaging the ground surface; and a lower stabilizer assembly for stabilizing a lower portion of the ladder assembly with respect to a ground surface, the lower stabilizer assembly comprising a pair of outboard foot assemblies with a position of each of the outboard foot assemblies being laterally adjustable with respect to the rails of the ladder assembly such that a lateral spacing of the pair of outboard foot assemblies is adjustable;

a medial stabilizer assembly for stabilizing a middle portion of the ladder assembly with respect to a ground surface, the medial stabilizer assembly comprising a pair of outboard steadying assemblies with a position of each of the outboard steadying assemblies being laterally adjustable with respect to the rails of the ladder assembly such that a lateral spacing of the pair of outboard steadying assemblies is adjustable.

9. The system of claim 8 wherein each of the outboard steadying assemblies comprises:

a medial outboard rail extendable substantially parallel to the rails of the ladder assembly, the medial outboard rail having a lower end, a lower end cavity extending into the lower end of the medial outboard rail;

a medial brace arm having an inner end extending into one of the ends of the rungs of the ladder assembly, an outer end of the medial brace arm being mounted on the outboard rail, the inner end of the medial brace arm being slidably received in the rung for adjusting a lateral spacing between the medial outboard rail and one of the rails of the ladder assembly;

securing means for releasably securing the position of the medial brace arm with respect to a respective one of the rungs of the ladder assembly;

an outboard steadying arm having an upper end slidably inserted into the lower end cavity of the medial outboard rail, the outboard steadying arm being extendable from the medial outboard rail for engaging the ground surface.

10. The system of claim 8 wherein each of the outboard foot assemblies comprises:

a lower outboard rail extending substantially parallel to the rails of the ladder assembly, the lower outboard rail having a lower end, a lower end cavity extending into the lower end of the lower outboard rail;

an upper lateral brace arm having an inner end extending into one of the ends of the rungs of the ladder assembly, an outer end of the upper lateral brace arm being mounted on the upper outboard rail, the inner end of the upper lateral brace arm being slidably received in the rung for adjusting a lateral spacing between the upper outboard rail and one of the rails of the ladder assembly;

a lower lateral brace arm having an inner end extending into one of the ends of the rungs of the ladder assembly, an outer end of the lower lateral brace arm being mounted on the lower outboard rail, the inner end of the lower lateral brace arm being slidably received in the rung for adjusting a lateral spacing between the lower outboard rail and one of the rails of the ladder assembly;

securing means for releasably securing the position of at least one of the lateral brace arms with respect to a respective one of the rungs of the ladder assembly; and an outboard extension leg having an upper end slidably inserted into the lower end cavity of the lower outboard rail, the outboard extension leg being extendable from the lower outboard rail for engaging the ground surface.

11. The system of claim 8 wherein each of the rails has an upper cavity extending into the upper end of the rail, and additionally comprising an upper stabilizer assembly for stabilizing an upper portion of the ladder assembly with respect to a structure, the upper stabilizer assembly comprising a pair of outboard support assemblies with a position of each of the outboard support assemblies being laterally adjustable with respect to the rails of the ladder assembly such that a lateral spacing of the pair of outboard support assemblies is adjustable.

12. The system of claim 8 wherein the ladder assembly comprises a scaffold structure with a pair of scaffold supports, each of the scaffold supports having the pair of rails and the plurality of rungs, the scaffold structure also including a platform for extending between the scaffold supports.

13. The system of claim 8 wherein the ladder assembly comprises a plurality of ladder sections each having the pair of rails and the plurality of rungs, each of the plurality of ladder sections being pivotally mounted to at least one other ladder section.

14. A stabilized ladder system comprising:

a ladder assembly comprising a pair of rails and a plurality of rungs extending between the rails, each of the rails having an upper end and a lower end, each of the rails having a lower cavity extending into the lower end of the rail, each of the rungs having opposite ends and at least one of the rungs having an end cavity extending into each of the opposite ends of the rung through the rails;

a ladder extending assembly comprising an upper extension arm mounted on each of the rails of the ladder assembly, each of the upper extension arms being extendable from the upper end of one of the rails, each of the upper extension arms having a lower end slidably inserted into the end cavity of the rail, each of the upper extension arms being extendable from the rail for engaging a structure; and a lower stabilizer assembly for stabilizing a lower portion of the ladder assembly with respect to a ground surface, the lower stabilizer assembly comprising a pair of outboard foot assemblies with a position of each of the outboard foot assemblies being laterally adjustable with respect to the rails of the ladder assembly such that a lateral spacing of the pair of outboard foot assemblies is adjustable.

15. The system of claim 14 wherein each of the rails has an upper cavity extending into the upper end of the rail, and additionally comprising an upper stabilizer assembly for stabilizing an upper portion of the ladder assembly with respect to a structure, the upper stabilizer assembly comprising a pair of outboard support assemblies with a position of each of the outboard support assemblies being laterally adjustable with respect to the rails of the ladder assembly such that a lateral spacing of the pair of outboard support assemblies is adjustable.

16. The system of claim 15 wherein each of the outboard support assemblies comprises:

an upper outboard rail extending substantially parallel to the rails of the ladder assembly, the upper outboard rail having an upper end, an upper end cavity extending into the upper end of the upper outboard rail;

a lateral brace arm having an inner end extending into one of the ends of the rungs of the ladder assembly, an outer end of the lateral brace arm being mounted on the outboard rail, the inner end of the lateral brace arm being slidably received in the rung for adjusting a lateral spacing between the upper outboard rail and one of the rails of the ladder assembly;

securing means for releasably securing the position of the lateral brace arms with respect to a respective one of the rungs of the ladder assembly;

an outboard extension arm having a lower end slidably inserted into the upper end cavity of the upper outboard rail, an upper end of the outboard extension arm having a contact member mounted thereon, the outboard extension arm and the contact member being extendable from the upper outboard rail for engaging the structure.

17. The system of claim 14 wherein the ladder assembly comprises a scaffold structure with a pair of scaffold supports, each of the scaffold supports having the pair of rails and the plurality of rungs, the scaffold structure also including a platform for extending between the scaffold supports.

18. The system of claim 14 wherein the ladder assembly comprises a plurality of ladder sections each having the pair of rails and the plurality of rungs, each of the plurality of ladder sections being pivotally mounted to at least one other ladder section.

19. The system of claim 18 wherein the plurality of ladder sections includes at least five ladder sections pivotally connected together to form a chain of ladder sections, the plurality of ladder sections having a first position in which the ladders sections form a step ladder configuration and a second position in which the ladder sections form a bridging ladder configuration.

* * * * *